United States Patent [19]

Stevens

[11] Patent Number: 5,350,095
[45] Date of Patent: Sep. 27, 1994

[54] RACK ASSEMBLIES MOUNTABLE TO TRUCKS FOR TRANSPORTING SHEET MATERIAL AND THE LIKE

[76] Inventor: John Stevens, 234 Mar Vista Dr., Monterey, Calif. 93940

[21] Appl. No.: 151,004

[22] Filed: Nov. 12, 1993

[51] Int. Cl.$^5$ .......................... B60R 9/00; B60P 3/00
[52] U.S. Cl. .............. 224/42.45 R; 224/310; 224/324
[58] Field of Search ............... 224/42.45 R, 310, 324, 224/309, 318; 182/127; 211/41, 60.1

[56] References Cited

U.S. PATENT DOCUMENTS

| | | | |
|---|---|---|---|
| 4,278,175 | 7/1981 | Jackson | 224/42.45 R |
| 4,989,768 | 2/1991 | McNulty | 224/42.45 R |
| 5,058,791 | 10/1991 | Henriquez et al. | 224/310 |

Primary Examiner—Henry J. Recla
Assistant Examiner—Steven O. Douglas
Attorney, Agent, or Firm—Michael J. Colitz, Jr.

[57] ABSTRACT

A rack assembly mountable to trucks for transporting sheet material and the like comprising a pair of generally vertically extending support rails positionable adjacent to one side of a truck and adapted to be coupled to the truck through components on the inboard side thereof. A lower support rail extends outboardly from each vertical rail and has an upper support surface for sheet material to be transported, each outboard end having an upturned end cap with the outboard lower edge of each vertical rail constituting an inboard end cap. Also provided is a pair of generally horizontal upper support rails coupled to the upper ends of the vertical rails and angled outwardly and downwardly from the truck, each upper support rail having an outboard end cap and an inboard end cap, the upper surfaces of the upper rails constituting support surfaces for ladders and the like. A lower attachment rail extends inboardly from adjacent to the lower end of each vertical rail for securement to a truck and an upper attachment rail extends inboardly from adjacent to the upper end of each vertical rail for securement to a truck.

3 Claims, 3 Drawing Sheets

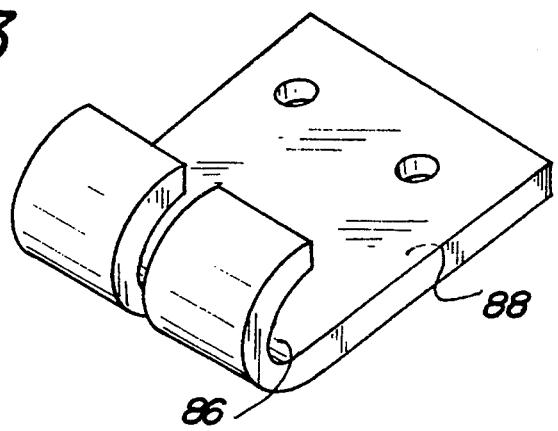
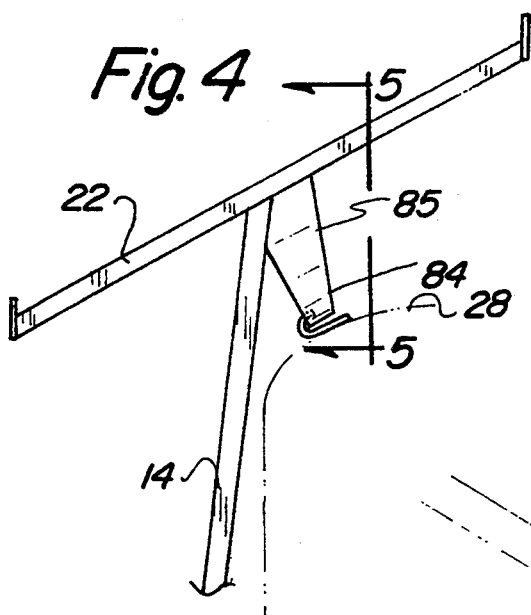
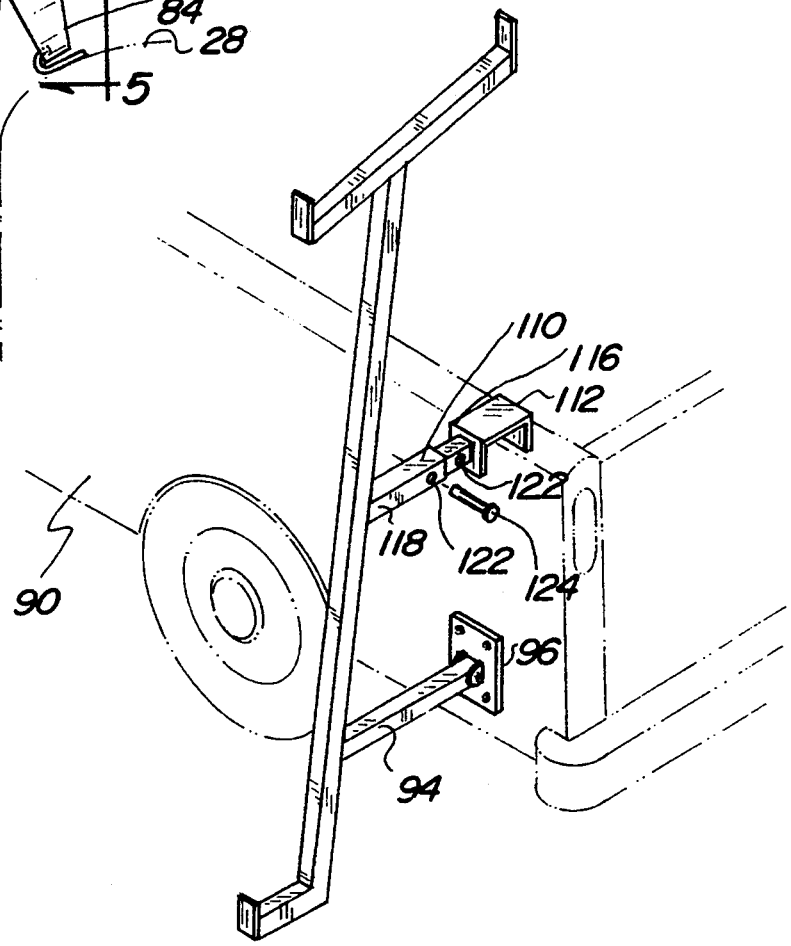

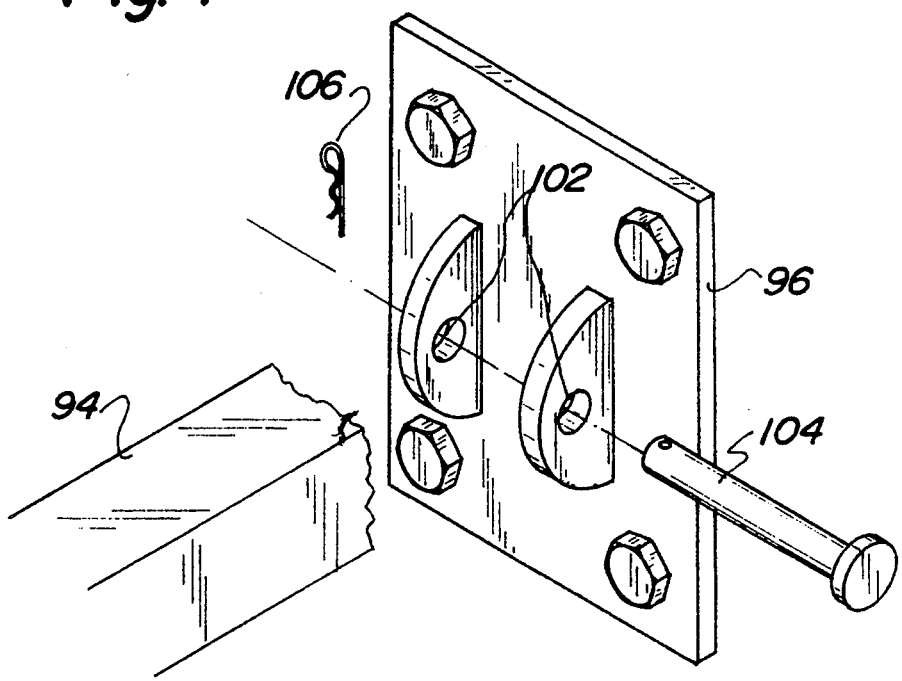
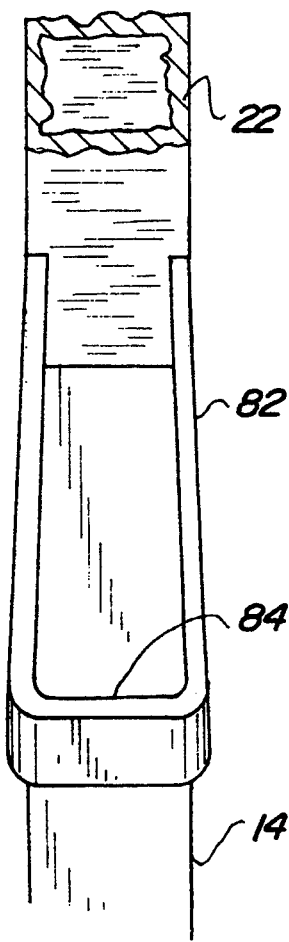

RACK ASSEMBLIES MOUNTABLE TO TRUCKS FOR TRANSPORTING SHEET MATERIAL AND THE LIKE

BACKGROUND OF THE INVENTION

1. Field of the Invention

The present invention relates to rack assemblies mountable to trucks for transporting sheet material and the like and more particularly pertains to the transporting of sheet material and the like through improved rack assemblies mountable on trucks.

2. Description of the Prior Art

The use of rack assemblies for trucks is known in the prior art. More specifically, rack assemblies for trucks heretofore devised and utilized for the purpose of transporting building components and materials through racks associated with trucks are known to consist basically of familiar, expected, and obvious structural configurations, notwithstanding the myriad of designs encompassed by the crowded prior art which has been developed for the fulfillment of countless objectives and requirements.

The prior art discloses a wide variety of truck racks. By way of example, note U.S. Pat. No. 4,170,331 to Faulstich discloses a vehicle ladder rack.

U.S. Pat. No. 4,304,336 to Mays discloses an interchangeable glass rack for pickup trucks.

U.S. Pat. No. 4,390,117 to Fagan discloses a ladder rack for vehicles.

U.S. Pat. No. 4,989,768 to McNulty discloses a removable side rack and attachments for pickup truck vehicles and the like.

U.S. Pat. No. 5,058,791 to Henriquez discloses a vehicular ladder rack.

Lastly, U.S. Pat. No. 5,137,194 to Kodis discloses a ladder support rack.

In this respect, the rack assemblies mountable to trucks for transporting sheet material and the like according to the present invention substantially depart from the conventional concepts and designs of the prior art, and in doing so provide an apparatus primarily developed for the purpose of transporting sheet material and the like through improved rack assemblies mountable on trucks.

Therefore, it can be appreciated that there exists a continuing need for new and improved rack assemblies mountable to trucks for transporting sheet material and the like which can be used for transporting sheet material and the like through improved rack assemblies mountable on trucks. In this regard, the present invention substantially fulfills this need.

SUMMARY OF THE INVENTION

In view of the foregoing disadvantages inherent in the known types of rack assemblies for trucks now present in the prior art, the present invention provides improved rack assemblies mountable to trucks for transporting sheet material and the like. As such, the general purpose of the present invention, which will be described subsequently in greater detail, is to provide new and improved rack assemblies mountable to trucks for transporting sheet material and the like and methods which have all the advantages of the prior art and none of the disadvantages.

To attain this, the present invention essentially comprises a new and improved rack assembly mountable to trucks for transporting sheet material and the like comprising, in combination, a pair of generally vertically extending support rails positionable adjacent to one side of a truck and adapted to be coupled to the truck through components on the inboard side thereof. A lower support rail extends outboardly from each vertical rail and has an upper support surface for sheet material to be transported, each outboard end having an upturned end cap with the outboard lower edge of each vertical rail constituting an inboard end cap. A pair of generally horizontal upper support rails are coupled to the upper ends of the vertical rails and angled outwardly and downwardly from the truck, each upper rail having an outboard end cap and an inboard end cap, the upper surfaces of the upper rails constituting support surfaces for ladders and the like. A lower attachment rail extends inboardly from adjacent to the lower end of each vertical rail, the inboard end of the lower rails each having a plate with apertures adapted to be bolted to a truck. A pair of upper attachment rails each have an outboard end attached to the inboard side of a vertical rail above the lower attachment rails, each having an inboard end with a mounting bracket and an associated bracket with bolts and nuts adapted to be releasably secured to the rain gutter of a truck and a pair of elastic bungee cord with hooks at opposite ends are adapted to be received in holes at the outboard ends of the upper and lower rails.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved rack assemblies mountable to trucks for transporting sheet material and the like which have all the advantages of the prior art rack assemblies for trucks and none of the disadvantages.

It is another object of the present invention to provide new and improved rack assemblies mountable to trucks for transporting sheet material and the like which may be easily and efficiently manufactured and marketed.

It is further object of the present invention to provide new and improved rack assemblies mountable to trucks for transporting sheet material and the like which are of durable and reliable constructions.

An even further object of the present invention is to provide new and improved rack assemblies mountable to trucks for transporting sheet material and the like which are susceptible of a low cost of manufacture with regard to both materials and labor, and which accordingly are then susceptible of low prices of sale to the consuming public, thereby making such rack assemblies mountable to trucks for transporting sheet material and the like economically available to the buying public.

Still yet another object of the present invention is to provide new and improved rack assemblies mountable to trucks for transporting sheet material and the like which provide in the apparatuses and methods of the prior art some of the advantages thereof, while simultaneously overcoming some of the disadvantages normally associated therewith.

Even still another object of the present invention is to transport sheet material and the like through improved rack assemblies mountable on trucks.

Lastly, it is an object of the present invention to provide new and improved rack assemblies mountable to trucks for transporting sheet material and the like comprising a pair of generally vertically extending support rails positionable adjacent to one side of a truck and adapted to be coupled to the truck through components on the inboard side thereof. A lower support rail extends outboardly from each vertical rail and has an upper support surface for sheet material to be transported, each outboard end having an upturned end cap with the outboard lower edge of each vertical rail constituting an inboard end cap. Also provided is a pair of generally horizontal upper support rails coupled to the upper ends of the vertical rails and angled outwardly and downwardly from the truck, each upper support rail having an outboard end cap and an inboard end cap, the upper surfaces of the upper rails constituting support surfaces for ladders and the like. A lower attachment rail extends inboardly from adjacent to the lower end of each vertical rail for securement to a truck and an upper attachment rail extends inboardly from adjacent to the upper end of each vertical rail for securement to a truck.

These together with other objects of the invention, along with the various features of novelty which characterize the invention, are pointed out with particularity in the claims annexed to and foxing a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged perspective view of a coupling component for the rack constructed in accordance with an alternate embodiment of the invention.

FIG. 4 is a side elevational view of the rack for the component of FIG. 3.

FIG. 5 is a cross-sectional view taken along line 5—5 of FIG. 4.

FIG. 6 is a perspective illustration of another alternate embodiment of the invention.

FIG. 7 is an exploded perspective view of the lower inboard end of one of the bottom rails as shown in FIG. 4.

The same reference numerals refer to the same parts through the various Figures.

DESCRIPTION OF THE PREFERRED EMBODIMENT

Figures 1, 2:
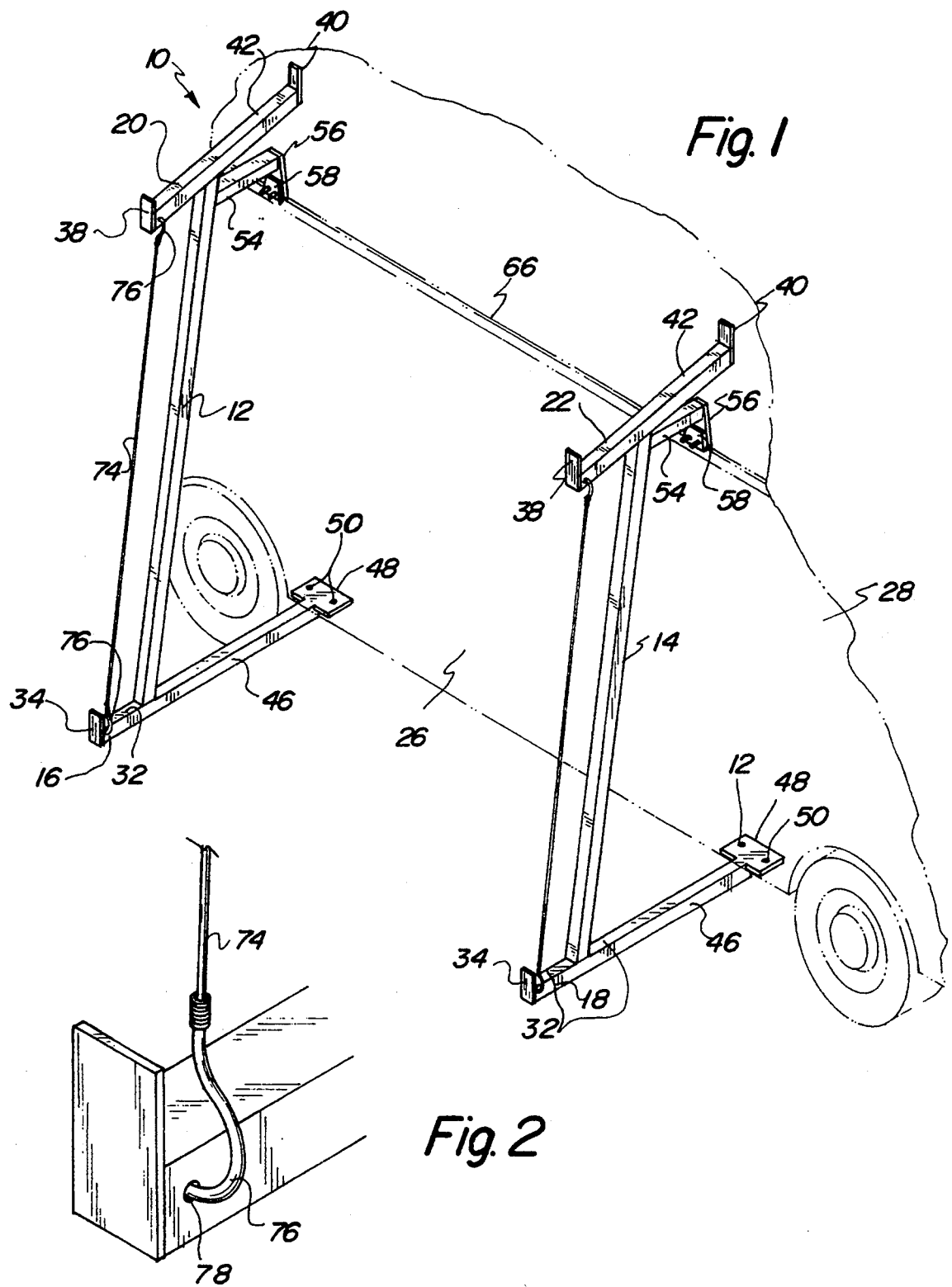
FIG. 1 is a perspective illustration of the preferred embodiment of the rack assemblies mountable to trucks for transporting sheet material and the like constructed in accordance with the principles of the present invention.
FIG. 2 is an enlarged perspective view of the lower outboard end of one of the bottom rails as shown in FIG. 1.

With reference now to the drawings, and in particular to FIG. 1 thereof, the preferred embodiment of the new and improved rack assemblies mountable to trucks for transporting sheet material and the like embodying the principles and concepts of the present invention and generally designated by the reference numeral 10 will be described.

Specifically, it will be noted in the FIGS. 1 and 2 that the invention is in a new and improved rack assembly 10 mountable to trucks for transporting sheet material, ladders and the like. In its broadest terms, the invention comprises a pair of vertical support rails 12 and 14, a pair of lower attachment rails 16 and 18, a pair of upper support rails 20 and 22 with coupling components therebetween.

More specifically, there is provided a pair of generally vertically extending support rails 12 and 14. Such rails are positionable adjacent to one side 26 of a panel truck 28. Such rails are coupled through components on the inboard side thereof.

Lower support rails 16 and 18 extend outboardly from each vertical rail 12 and 14. Each lower rail has an upper support surface 32 for sheet material to be transported. The outboard ends each have an upturned end cap 34. The outboard lower edge of the vertical rail constitutes an inboard end cap for the support surface 32.

A pair of generally horizontal upper support rails 20 and 22 are coupled to the upper ends of the vertical rails 12 and 14. They are angled outwardly and downwardly from the truck and have an outboard end cap 38 and an inboard end cap 40. The upper surface 42 of the upper rails 20 and 22 constitute a support surface for ladders and the like.

Lower attachment rails 46 extend inboardly from each of the lower ends of the vertical rails 12 and 14.

The inboard ends of the lower rails have a plate 48 with apertures 50 adapted to be bolted to the underside of a truck.

A pair of upper attachment rails 54 extend generally horizontally and have outboard ends attached to the upper inboard ends of the vertical rails. Their inboard ends are each formed with a mounting bracket 56 and an associated bracket 58 with bolts and nuts adapted to be releasably secured to the rain gutter 66 of a truck.

An elastic bungee cord 74 with hooks 76 at its ends is releasably coupled to apertures 78 in the horizontal rails adjacent to their outboard ends. Their function is for securement of the transported sheet material to the support surfaces 32.

FIGS. 3 and 4 illustrate an alternate embodiment of the invention. In such embodiment, a pair of downwardly extending, generally vertical, inboard attachment rails 82, in a generally U-shaped configuration, are secured to the junction of its associated vertical support rail 12 and 14 in the region where it couples with an upper support rail 20 and 22 on the lower inboard side thereof. The lowermost edge 84 of the U-shaped member is adapted to be removably received in the curved part 88 of a generally u-shaped bracket 86. The bracket 86 is bolted to the roof of the truck. This arrangement represents a simplified approach for coupling the upper extents of the assembly to a truck.

Another alternate embodiment of the invention is shown in FIGS. 6 through 8. This embodiment is designed for coupling with a flatbed truck 90 rather than the panel truck of the prior embodiments. In such embodiment, the lower vertical inboard rails 94 are comprised of an inboard end with a horizontal aperture. An associated plate 96 for each rail 94 includes a clevis 98 with apertures 102 aligned with the aperture through the rail 94. A pin 104 extends through the apertures of the rail and clevis to provide a pivotable support as may be required for trucks of varying sizes and shapes. A cotter pin 106 through the end of pin 104 allows for a quick disconnect so as to allow removal of the assembly when so desired. The plate, however, is preferably bolted to the truck.

The upper attachment rails 110 each have at their inboard ends an inverted u-shaped bracket 112. The brackets are sized and shaped to fit over the side wall of a pickup truck 90. In order to accommodate pickup trucks of varying sizes and shapes, the rail 110 is formed of inner and outer segments 116 and 118 with apertures 122 therethrough. A locking pin 124 secures together preselected apertures to maintain the rails 110 at a predetermined length.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rack assembly mountable to trucks for transporting sheet material and the like comprising:

a pair of generally parallel extending side support rails having upper and lower ends and positionable adjacent to one side of a truck in spaced apart generally vertical positions, each said rail including means on one side thereof for coupling said side rails to the truck for supporting each rail in said respective positions;

a lower support rail extends extending laterally from the opposite side of each side rail adjacent the lower end thereof and having an upper support for sheet material to be transported, each lower support rail having an outer end with an upturned end cap mounted thereon in spaced relation to said opposite side of each generally vertical rail; a pair of generally parallel upper support rails coupled to the upper ends of the side rails and angled outwardly and downwardly with respect to the side of the truck, each upper rail having opposite ends with an upturned end cap mounted on each said end, the upper surfaces of the upper rails constituting support surfaces for elongated objects;

said means for coupling including a lower attachment rail extending laterally from said one side and adjacent to the lower end of each side rail for securement to a truck; and said means for coupling further including an upper attachment rail having one end attached to said one side of said side rail above the lower attachment rail and another end for securement to a truck.

2. The apparatus as set forth in claim 1 wherein the upper attachment rails include a mounting bracket thereon and an associated bracket with bolts and nuts adapted to be releasably secured to the rain gutter of a truck.

3. A rack assembly mountable to trucks for transporting sheet material and the like comprising:

a pair of generally parallel extending side support rails having upper and lower ends and positionable adjacent to one side of a truck in spaced apart generally vertical positions, each said rail including means on one side thereof for coupling said side rails to the truck for supporting each rail in said respective positions;

a lower support rail extends extending laterally from the opposite side of each side rail adjacent the lower end thereof and having an upper support for sheet material to be transported, each lower support rail having an outer end with an upturned end cap mounted thereon in spaced relation to said opposite side of each generally vertical rail and a hole in each lower rail adjacent said outer end;

a pair of generally parallel upper support rails coupled to the upper ends of the side rails and angled outwardly and downwardly with respect to the side of the truck, each upper rail having opposite ends with an upturned end cap mounted on each said end, the upper surfaces of the upper rails constituting support surfaces for elongated objects and a hole in each upper rail adjacent an end remote from said truck;

said means for coupling including a lower attachment rail extending laterally from said one side and adjacent to the lower end of each side rail, said lower attachment rail having one end attached to said side rail and an opposite end, a plate with apertures therethrough mounted on said opposite end for bolting said plate to a truck;

said means for coupling further including a pair of upper attachment rails each having one end attached to said one side of each side rail above the lower attachment rails, each upper attachment rail having an opposite end with a mounting bracket thereon and an associated bracket with bolts and nuts adapted to be releasably secured to a rain gutter of a truck; and a pair of elastic bungee cords with hooks at opposite ends thereof adapted to be received in said holes in the upper and lower rails.

* * * * *